(12) United States Patent
Carter et al.

(10) Patent No.: US 10,001,029 B2
(45) Date of Patent: Jun. 19, 2018

(54) BEARING LOCKING ASSEMBLIES AND METHODS OF ASSEMBLING THE SAME

(71) Applicant: General Electric Company, Schenectady, NY (US)

(72) Inventors: Bruce Alan Carter, Cincinnati, OH (US); Ravindra Shankar Ganiger, Karnataka (IN); Richard Charles Wainwright, Lynn, MA (US); Venkatachalapathy Moongilpalayam Chenniappan, Karnataka (IN); Krzysztof Chelstowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/111,077

(22) PCT Filed: Dec. 5, 2014

(86) PCT No.: PCT/US2014/068801
§ 371 (c)(1),
(2) Date: Jul. 12, 2016

(87) PCT Pub. No.: WO2015/108628
PCT Pub. Date: Jul. 23, 2015

(65) Prior Publication Data
US 2016/0341073 A1    Nov. 24, 2016

(30) Foreign Application Priority Data

Jan. 15, 2014 (PL) .......................... 406855

(51) Int. Cl.
*F01D 25/16* (2006.01)
*F16C 35/06* (2006.01)
(Continued)

(52) U.S. Cl.
CPC ............ *F01D 25/162* (2013.01); *F01D 15/10* (2013.01); *F02C 7/06* (2013.01); *F16C 19/06* (2013.01);
(Continued)

(58) Field of Classification Search
CPC ...... F16C 19/06; F16C 35/067; F16C 35/042; F16C 2360/23; F16B 39/10; F16B 39/22;
(Continued)

(56) References Cited

U.S. PATENT DOCUMENTS 2,147,787 A * 2/1939 Ferguson .............. F16C 19/546
384/540
2,438,542 A * 3/1948 Cushman ................ B64C 11/06
29/898.061

(Continued)

FOREIGN PATENT DOCUMENTS

CN        1506588 A     6/2004
CN      103210225 A     7/2013

(Continued)

OTHER PUBLICATIONS

International Search Report and Written Opinion issued in connection with corresponding PCT application PCT/US2014/068801 dated Mar. 27, 2015.

(Continued)

*Primary Examiner* — Marcus Charles
(74) *Attorney, Agent, or Firm* — General Electric Company; William Scott Andes

(57) ABSTRACT

A bearing assembly for use in a gas turbine engine is provided. The bearing assembly includes a bearing retainer having an inner portion, an outer portion spaced radially apart from the inner portion, and an intermediate portion connecting the inner portion and the outer portion, wherein the inner portion and the outer portion define a space (Continued)

there-between. The bearing assembly also includes a bearing housing having an extended portion positioned within the space. The bearing assembly also includes a locking assembly comprising a locking plate and an axial keyway that extends axially away from the locking plate. The locking plate is coupled to the bearing retainer and the axial keyway is coupled to the extended portion of the bearing housing.

20 Claims, 5 Drawing Sheets

(51) Int. Cl.
  *F16C 19/06* (2006.01)
  *F02C 7/06* (2006.01)
  *F16C 35/067* (2006.01)
  *F01D 15/10* (2006.01)
  *F16B 39/22* (2006.01)
  *F16B 39/32* (2006.01)
  *F16B 39/10* (2006.01)
  *F16C 35/04* (2006.01)

(52) U.S. Cl.
  CPC ........ *F16C 35/067* (2013.01); *F05D 2220/32* (2013.01); *F05D 2230/60* (2013.01); *F05D 2260/30* (2013.01); *F16B 39/10* (2013.01); *F16B 39/22* (2013.01); *F16B 39/32* (2013.01); *F16C 35/042* (2013.01); *F16C 2360/23* (2013.01)

(58) Field of Classification Search
  CPC ...... F16B 39/32; F16B 39/103; F16B 37/042; F01D 15/10; F01D 25/162; F05D 2230/60; F05D 2260/30; F05D 2220/32; F02C 7/06; Y10T 29/4932
  USPC ....... 384/540, 537, 542, 562, 585, 601, 903; 411/227, 232, 246, 279, 293; 403/321
  See application file for complete search history.

(56) References Cited

U.S. PATENT DOCUMENTS

| | | |
|---|---|---|
| 2,605,148 A | 7/1952 | Shoup |
| 2,815,231 A | 12/1957 | Wilson |
| 2,975,007 A * | 3/1961 | Zwicker .................. F16C 19/06 384/498 |
| 3,915,523 A | 10/1975 | Shank |
| 4,966,474 A * | 10/1990 | Geiger .................... F16B 39/02 384/517 |
| 4,971,457 A * | 11/1990 | Carlson .................. F01D 25/164 384/581 |
| 5,560,687 A * | 10/1996 | Hagelthorn ........... B60B 27/001 301/105.1 |
| 6,257,078 B1 | 7/2001 | Vencill |
| 6,413,046 B1 * | 7/2002 | Penn ..................... F01D 21/045 384/202 |
| 6,579,010 B2 * | 6/2003 | Trapp ..................... F01D 25/16 384/537 |
| 7,108,428 B2 * | 9/2006 | Ason ...................... F16C 25/06 29/898.09 |
| 7,384,199 B2 | 6/2008 | Allmon et al. |
| 7,794,153 B2 * | 9/2010 | Szczepanski ........... B60B 35/18 384/519 |
| 8,540,433 B2 * | 9/2013 | Wendeberg ........... F16C 35/073 384/510 |
| 8,646,978 B2 * | 2/2014 | Jadczak ................. F16C 19/52 384/535 |
| 9,500,100 B2 | 11/2016 | Carter et al. |
| 2004/0115041 A1 | 6/2004 | Scardicchio et al. |
| 2009/0034896 A1 | 2/2009 | Fisher |
| 2013/0156574 A1* | 6/2013 | Antunes ................ F01D 21/045 415/229 |
| 2013/0205604 A1 | 8/2013 | Esenwein et al. |

FOREIGN PATENT DOCUMENTS

| | | | |
|---|---|---|---|
| CN | 103256376 A | 8/2013 | |
| EP | 2576997 B1 * | 7/2016 | .......... F01D 21/045 |
| GB | 2451731 A * | 2/2009 | .......... F01D 25/162 |
| JP | 2000274433 A | 10/2000 | |

OTHER PUBLICATIONS

Chinese Office Action issued in connection with corresponding CN Application No. 201480073305.3 dated Jun. 27, 2017.

* cited by examiner

BEARING LOCKING ASSEMBLIES AND METHODS OF ASSEMBLING THE SAME

CROSS-REFERENCE TO RELATED APPLICATION

This Application is a US national filing under § 371 of PCT Application PCT/US14/068,801, filed Dec. 5, 2014, which is incorporated by reference in its entirety.

BACKGROUND

The field of the disclosure generally relates to turbine engine components, and more specifically to bearing locking assemblies that couple bearing retainers to bearing housings.

Gas turbine engines typically include a compressor, a combustor, and at least one turbine. The compressor compresses air, which may be mixed with fuel and channeled to the combustor. The combustor then ignites the fuel mixture to generate hot combustion gases. The hot combustion gases may be channeled to the turbine, which extracts energy from the hot combustion gases. The extracted energy from the combustion gases powers the compressor and produces useful work. For example, the extracted work may propel an aircraft in flight by driving a fan or propeller; alternatively the extracted work may generate power for an electrical load.

Gas turbine engines frequently contain one or more bearing assemblies to support rotating components within stationary housings. For example, a rotating shaft may be supported by a bearing to accommodate the rotating shaft while coupling the shaft to a stationary housing. Bearing assemblies may also support rotating elements between or within other rotating elements. Bearing assemblies typically feature one or more bearing retainers that secure the bearing in place relative to other structures, for example bearing retainers may secure the bearing within a bearing housing. Bearing retainers may be removable, for example, to permit initial assembly and/or repair of elements of the bearing assembly. More specifically, removable bearing retainers are typically threadably engaged externally or internally to the end of a shaft or housing, and locked into place with a locking assembly, such as a bolt and nut combination.

However, known removable bearing retainers have locking assemblies that require a large amount of radial clearance for assembly and disassembly. For example, known bearing retainers, such as annular spanner nuts, are coupled to the housing with a set of radially outward projecting bolts spaced around the circumference of the bearing retainer. A nut or similar device is coupled to the radially outside end of the bolt such that the bearing retainer and bearing housing are secured into place. However, because current bearing assemblies have nuts and bolts that are directed radially outward, the assembly requires significant radial clearance to accommodate tools that assemble and disassemble the bearing assembly. Accordingly, features such as radially outer damper housings and deeper scallops in the bearing housing are difficult to use without blocking or limiting access to the locking assembly. Accordingly, there remains a need for a bearing locking assembly which may be installed with limited axial and/or radial space.

SUMMARY OF THE INVENTION

In one aspect, a bearing assembly for use in a gas turbine engine includes a bearing retainer having an inner portion, an outer portion spaced radially apart from the inner portion, and an intermediate portion connecting the inner portion and the outer portion, wherein the inner portion and the outer portion define a space there-between. The bearing assembly also includes a bearing housing having an extended portion positioned within the space. The bearing assembly also includes a locking assembly comprising a locking plate and an axial keyway that extends axially away from the locking plate. The locking plate is coupled to the bearing retainer and the axial keyway is coupled to the extended portion of the bearing housing.

In another aspect, a locking assembly for use in a gas turbine engine includes a substantially flat locking plate that defines at least one slot. The locking assembly also includes an axial keyway coupled to the flat locking plate and extending axially outward from the locking plate. The axial keyway is configured to be inserted through a window of a bearing retainer and coupled to a bearing housing. The locking assembly also includes at least one retaining element configured to be inserted through a respective slot of the locking plate such that the locking plate is secured to the bearing retainer.

In another aspect, a method of assembling a bearing housing for use in a gas turbine engine includes positioning an extended portion of a bearing housing between an inner portion and an outer portion of a bearing retainer. The inner portion is radially spaced from the outer portion and an intermediate portion connects the inner portion and the outer portion. The method also includes defining a window in the intermediate portion of the bearing retainer, wherein the window extends from a first axial end to a second axial end of the intermediate portion. The method also includes coupling an axial keyway to a locking plate, wherein the axial keyway extends axially away from the locking plate. The method also includes coupling the locking plate to the bearing retainer, inserting the axial keyway through the window, and coupling the axial keyway with the extended portion of the bearing housing.

DETAILED DESCRIPTION OF THE DISCLOSURE

The embodiments described herein provide turbine engine components that include a bearing assembly. More specifically, the bearing assembly described herein includes a bearing that is secured in position by a bearing retainer and a bearing housing. The bearing retainer and the bearing housing are secured together by a locking assembly that is separately coupled to each of the bearing retainer and the bearing assembly. The locking assembly serves as an anti-rotation device to reduce deflections of the bearing under heavy cyclic forces, and prevents relative rotation between the bearing retainer and the bearing housing.

In the example embodiment, the locking assembly includes a substantially flat locking plate that defines at least one slot configured to receive a retaining element. The retaining element passes through the slot to self-locking inserts defined in the bearing retainer in order to couple the locking plate to the bearing retainer. The locking assembly also includes an axial keyway coupled to, or formed integrally with, the locking plate. The axial keyway extends axially aft ward from the locking plate toward the bearing assembly. The axial keyway has a cavity defined in an aft axial end of the keyway, and the cavity is configured to receive a part of the bearing housing. The keyway extends through a window defined in the bearing retainer and receives an extended portion of the bearing housing within the cavity. The axial keyway and the extended portion of the bearing housing may have corresponding retaining features that secure the two elements together. Accordingly, the locking assembly is coupled to both the bearing housing and the bearing retainer, and facilitates preventing relative rotation between the two elements. Specifically, the axial keyway prevents relative rotation between the two elements, and the locking plate securely couples the locking assembly into position.

As the retaining element and axial keyway are oriented in an axial direction, the locking assembly facilitates preventing rotation between the bearing retainer and the bearing housing while requiring little radial or axial clearance. Furthermore, the locking assembly defined herein facilitates mechanical repair and assembly by securing the locking assembly to an axial face of the bearing retainer. In addition, damping material and/or deeper bearing housing scallops can be implemented without substantially limiting access to the bearing assembly during maintenance.

Figure 1:
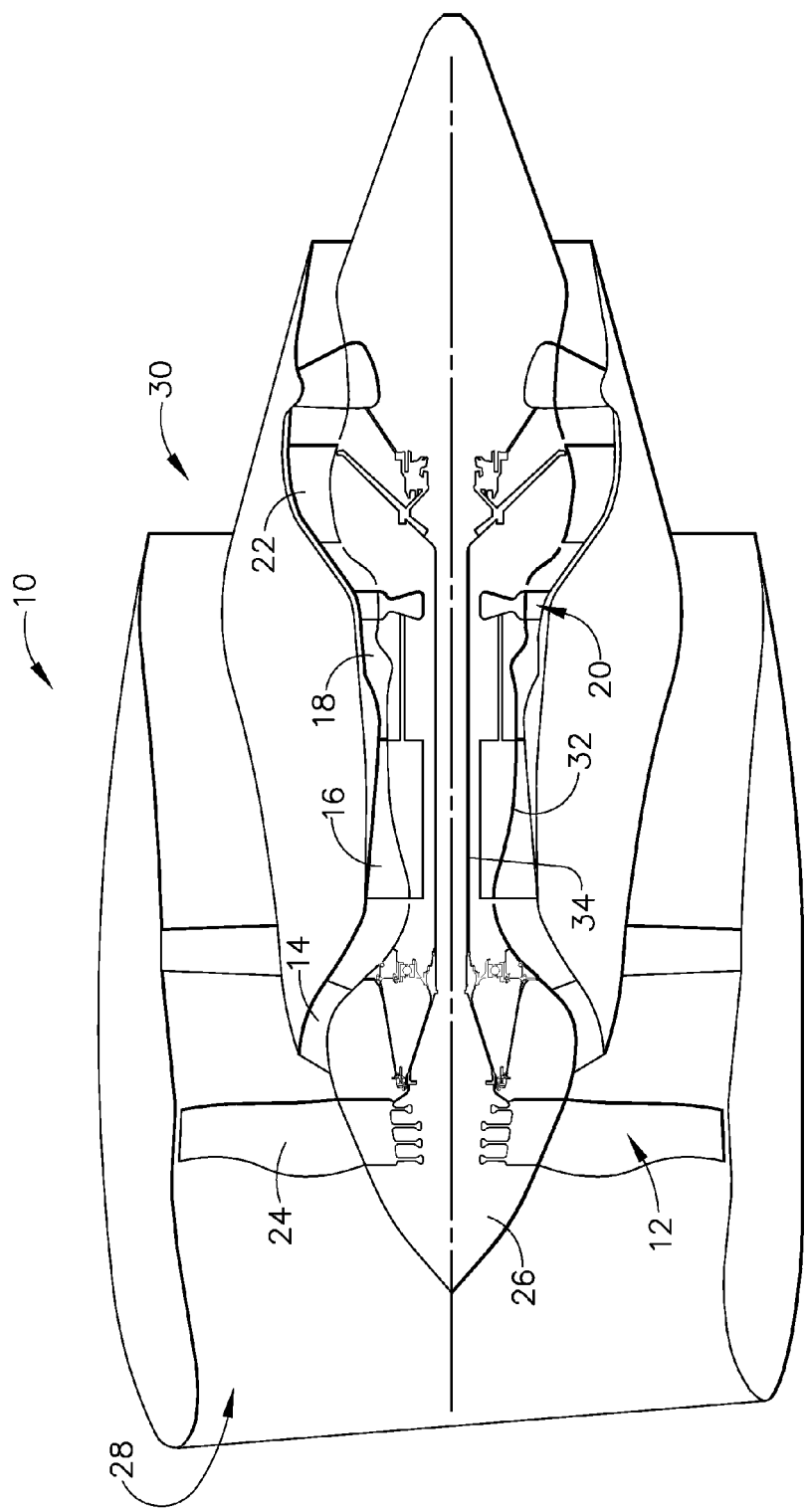
FIG. 1 is a cross-sectional schematic illustration of an exemplary turbine engine assembly.

FIG. 1 is a schematic illustration of an exemplary gas turbine engine 10 including a fan assembly 12, a booster 14, a high pressure compressor 16, and a combustor 18. Engine 10 also includes a high pressure turbine 20 and a low pressure turbine 22. Fan assembly 12 includes an array of fan blades 24 extending radially outward from a rotor disk 26. Engine 10 has an intake side 28 and an exhaust side 30. Fan assembly 12, booster 14, and low pressure turbine 22 may be coupled to a first rotor shaft 32, and compressor 16 and high pressure turbine 20 may be coupled to a second rotor shaft 34. Although described as a gas turbine engine 10, engine 10 may be any type of turbine engine that includes turbo-machinery components.

In operation, air flows through fan assembly 12 and compressed air is supplied to high pressure compressor 16 through booster 14. The highly compressed air is delivered to combustor 18, where it is mixed with a fuel and ignited to generate combustion gases. The combustion gases are channeled from combustor 18 to drive turbines 20 and 22. Turbine 22 drives fan assembly 12 and booster 14 by way of shaft 32. Turbine 20 drives compressor 16 by way of shaft 34.

Figure 2:
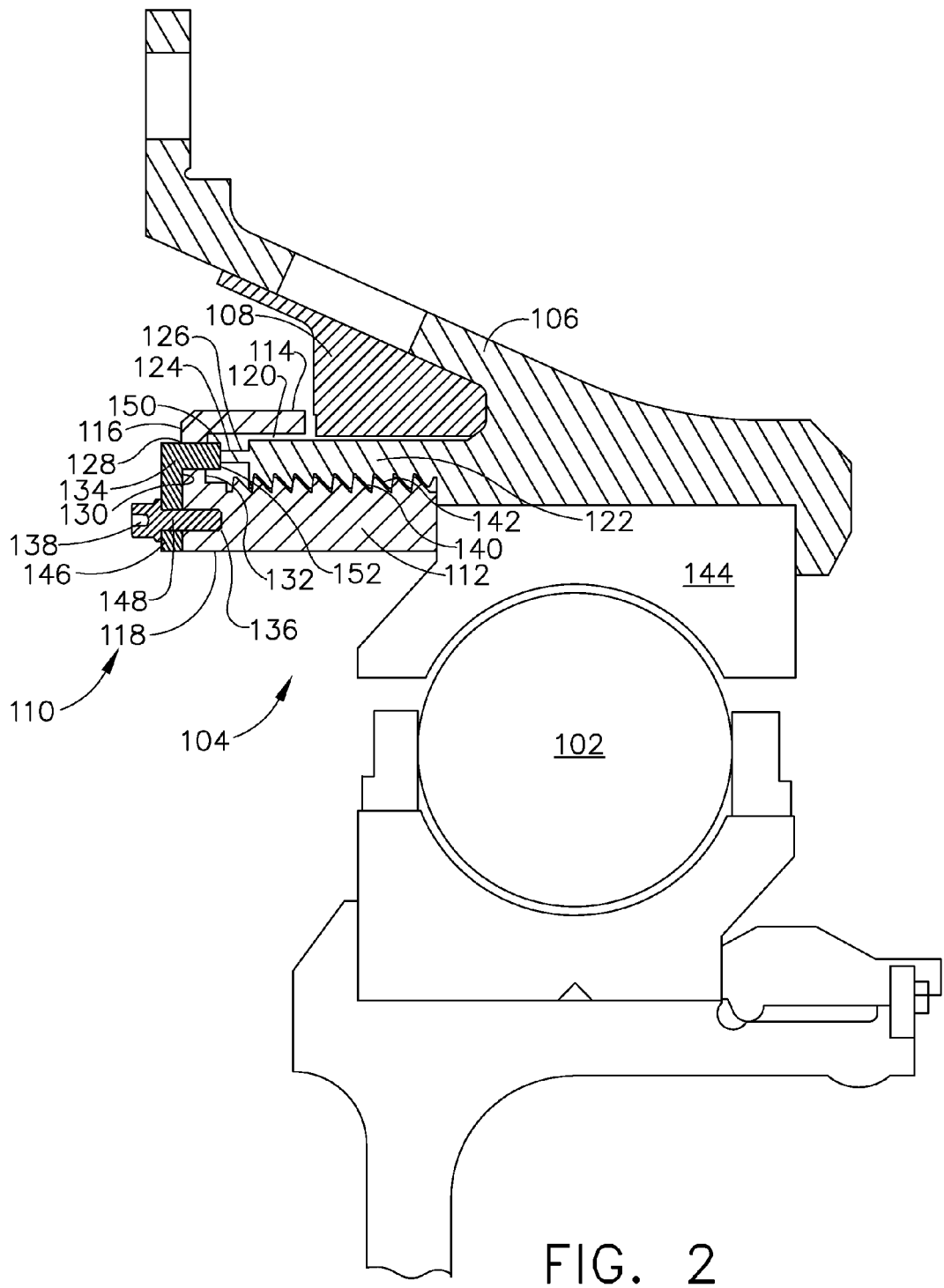
FIG. 2 is a partial cut-away cross-sectional view of an exemplary bearing assembly that may be used with the gas turbine engine shown in FIG. 1.

FIG. 2 is a partial cut-away cross-sectional view of a bearing assembly 100 for use in gas turbine engine 10 (shown in FIG. 1). In the exemplary embodiment, bearing assembly 100 includes a ball bearing 102, a bearing retainer 104, a bearing housing 106, a damper housing 108, and a locking assembly 110.

Bearing retainer 104 includes an inner portion 112, an outer portion 114, and an intermediate portion 116 connecting inner portion 112 and outer portion 114. In the example embodiment, bearing retainer 104 is formed as an annular spanner nut with inner portion 112 and outer portion 114 being spaced apart in a radial direction. In the exemplary embodiment, intermediate portion 116 is formed on a forward axial portion 118 of bearing retainer 104 such that bearing retainer 104 has a "hook shaped" profile (i.e. an axial end extends forwardly, upwardly, and then rearwardly over a portion of the body), a j-shaped profile, and/or a c-shaped profile. More specifically, bearing retainer 104 defines a space 120 between inner portion 112 and outer portion 114. An extended portion 122 of bearing housing 106, for example a spring-finger housing, is positioned within space 120, and is radially aligned with a part of intermediate portion 116. Extended portion 122 may include machined slot features 124 on the forward axial portion 126 of extended portion 122.

Intermediate portion 116 defines a window 128 that extends axially through intermediate portion 116 from a first axial end 130 to a second axial end 132. Window 128 may be substantially rectangular in shape and be configured to receive an axial keyway 134 of locking assembly 110. Bearing retainer 104 also defines at least one self-locking insert 136 in inner portion 112. Self-locking insert 136 is configured to receive at least one retaining element 138 of locking assembly 110.

Bearing retainer 104 may also include a threaded contact surface 140 formed on radially outer surface 142 of inner portion 112. Threaded contact surface 140 is in contact with extended portion 122 of bearing housing 106, and facilitates securing bearing retainer 104 to bearing housing 106. Bearing retainer 104 and bearing housing 106 are coupled to outer race 144 of bearing assembly 100, and facilitate securing bearing 102 within outer race 144. In the example embodiment, contact surface 140 is configured to be releasable, such that contact surface 140 and bearing retainer 104 are removably coupled to bearing housing 106. Removable coupling enables bearing retainer 104 and bearing housing 106 to be disassembled for repair or replacement of components.

Bearing assembly 100 also includes a locking assembly 110 that removably couples bearing retainer 104 to bearing housing 106. In the example embodiment, locking assembly 110 includes a locking plate 146 configured to engage with forward axial portion 118 of bearing retainer 104. More specifically, locking plate 146 defines at least one slot 148 configured to receive a respective retaining element 138, and to secure locking plate 146 to bearing retainer 104. Retaining element 138 may be a bolt, screw, cotter pin, key, lockwire, polymeric compound, or any other device that secures locking plate 146 to inner portion 112. For example, in one implementation, retaining element 138 is a stud that extends from bearing retainer 104 through slot 148 and is capped by a nut (not shown). In some implementations, a plurality of retaining elements 138 may be utilized as needed to couple locking plate 146 to bearing retainer 104.

Locking assembly 110 also includes axial keyway 134 coupled to, or formed integrally with, locking plate 146. Axial keyway 134 may be substantially rectangular in shape. Alternatively, axial keyway 134 may be any shape that enables axial keyway 134 to function as described herein. Aft axial end 150 of axial keyway 134 defines a cavity 152 sized and shaped to receive a part of extended portion 122 therein. When assembled, cavity 152 of axial keyway 134 is engaged with extended portion 122 of bearing housing 106. More specifically, axial keyway 134 extends through window 128 of bearing retainer 104 and receives a part of extended portion 134 within cavity 152. Locking assembly 110 also facilitates preventing rotation of bearing retainer 104 with respect to bearing housing 106 and facilitates reducing axial deflection of bearing 102 due to high-overturning moment loads.

Bearing assembly 100 also includes a damper housing 108 matingly engaged with bearing housing 106. Damper housing 108 may be a squeeze film damper and/or any other type of damper that reduces vibration of gas turbine engine 10 (shown in FIG. 1). In the example embodiment, damper housing 108 is positioned above extended portion 122 of bearing housing 106.

In the example embodiment, bearing assembly 100 is assembled by positioning extended portion 122 of bearing housing 106 between inner portion 112 and outer portion 114 of bearing retainer 104. Intermediate portion 116 connects inner portion 112 and outer portion 114 together, and defines window 128 that extends from a first axial end 130 to a second axial end 132 of intermediate portion 116. Assembling bearing assembly 100 also includes coupling axial keyway 134 to locking plate 146. Axial keyway 134 extends axially away from the locking plate 146 toward bearing housing 106. Assembling bearing assembly 100 also includes coupling locking plate 146 to bearing retainer 104, inserting axial keyway 134 through window 128, and coupling axial keyway 134 with extended portion 122.

Figure 3:
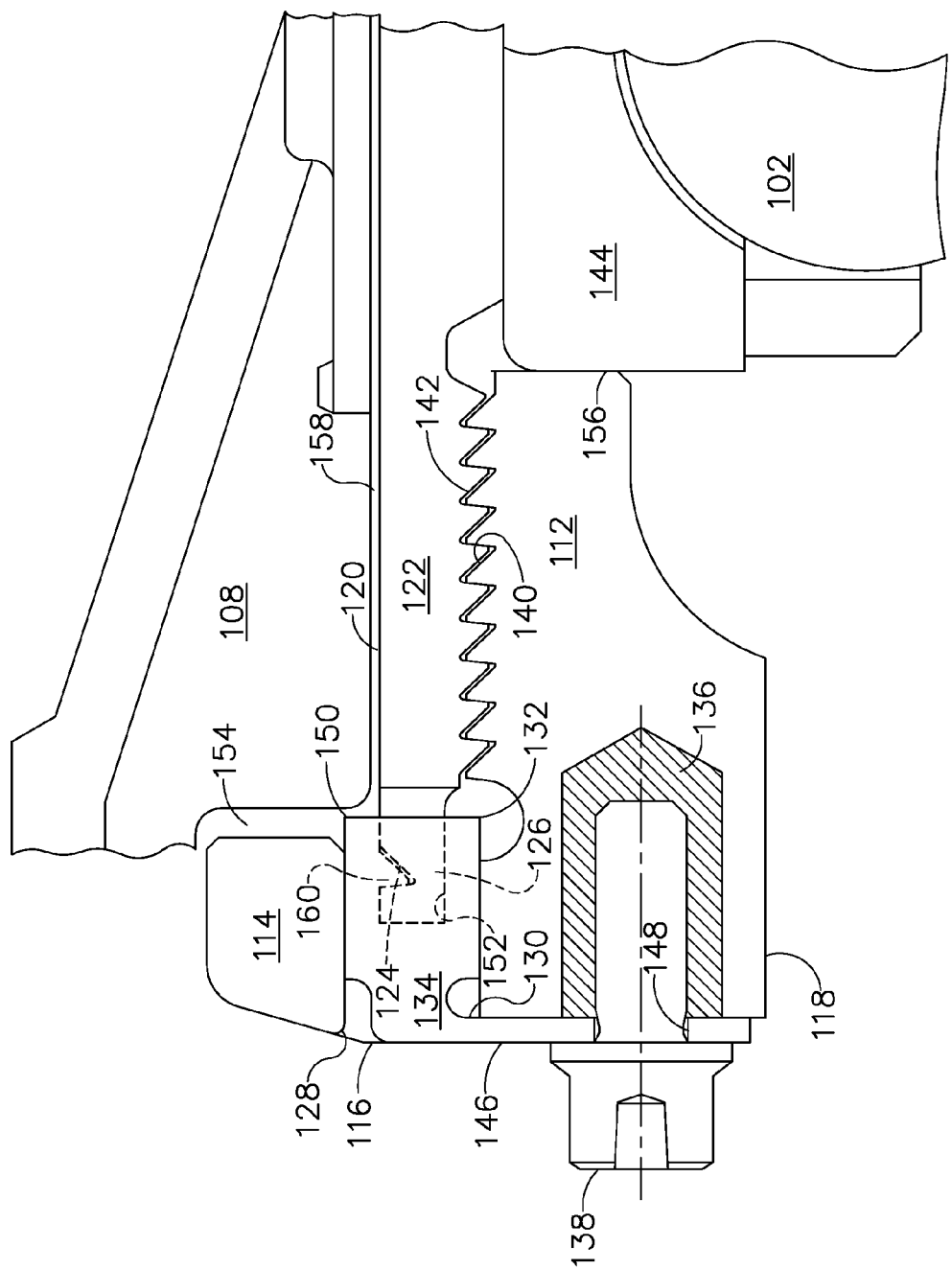
FIG. 3 is an enlarged view of the bearing assembly shown in FIG. 2 which shows in greater detail the spatial relationship of the bearing retainer bearing housing, and locking assembly shown in FIG. 2.

FIG. 3 is an enlarged view of bearing assembly 100 including bearing retainer 104, bearing housing 106, damper housing 108, and locking assembly 110, which shows in greater detail the spatial relationship of bearing retainer 104 with bearing housing 106. The bearing assembly includes an aft gap 154 defined between damper housing 108 and outer portion 114 of bearing retainer 104. Aft gap 154 facilitates face 156 of inner portion 112 contacting outer race 144 prior to outer portion 114 contacting damper housing 108. The bearing assembly also includes a radial gap 158. Radial gap 158 is defined between outer portion 114 of bearing retainer 104 and extended portion 122 of bearing housing 106. Radial gap 158 controls the amount of thread disengagement possible before bearing retainer 104 moves with bearing 102.

Axial keyway 134 of locking assembly 110 may include at least one retaining feature 160 configured to matingly engage with machined slot features 124 of bearing housing 106. In particular, retaining features 160 mate with corresponding slot features 124 to secure locking assembly 110 to extended portion 122. For example, retaining features 160 may be a plurality of teeth projecting radially inward into cavity 152 to engage with corresponding slot features 124. When secured, locking assembly 110 facilitates preventing rotation of bearing retainer 104 relative to bearing housing 106.

Figure 4:
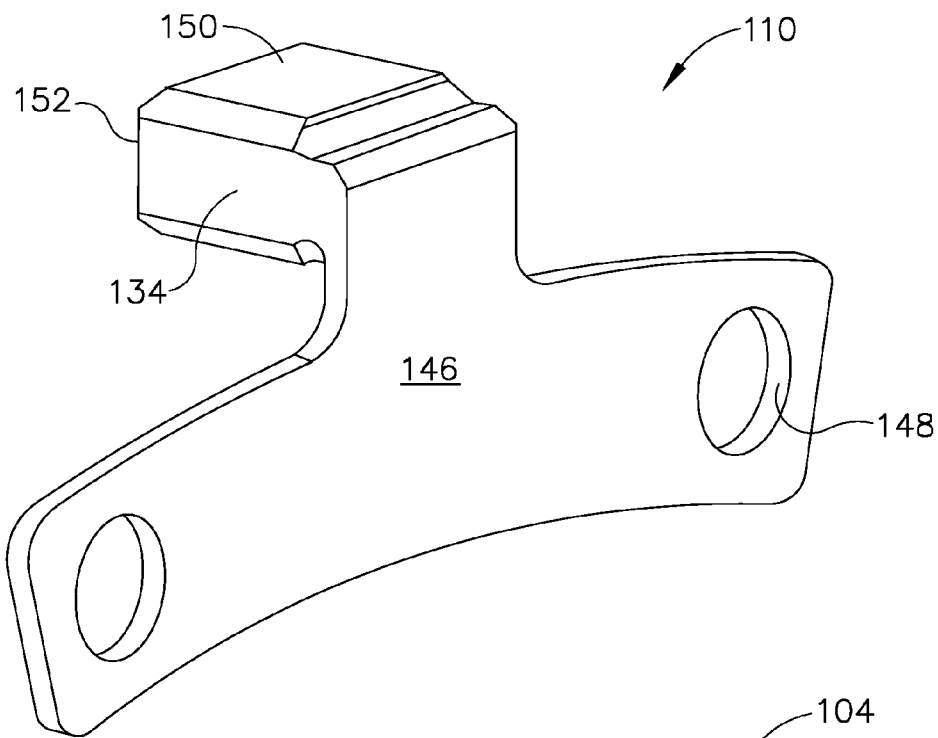
FIG. 4 is a perspective view of the exemplary locking assembly shown in FIG. 3.

FIG. 4 is a perspective view of an exemplary locking assembly 110. In the example embodiment, locking assembly 110 may be formed using any suitable manufacturing method. For example locking assembly 110 may be formed from a single piece of material, as shown in FIG. 2 by forging and machining the single piece of material into the desired geometry. Alternatively multiple individual elements may be joined together via any method suitable for the material or materials to be joined. For example, locking assembly 110 may be formed by bonding two or more separate pieces, for example, by brazing, soldering, and/or welding.

In the example embodiment, gas turbine engine 10 (shown in FIG. 1) includes a plurality of locking assemblies 110 spaced circumferentially about bearing retainer 104. Specifically, each locking assembly 110 includes a single axial keyway 134 and at least one slot 148. Each locking assembly 110 is secured to bearing retainer 104 by inserting retaining element 138 into respective slots 148. Each locking assembly 110 is secured to bearing housing 106 by extending axial keyway 134 through respective windows 128 and coupling axial keyway to extended portion 122. Each locking assembly 110 may be secured to bearing housing 106 by coupling retaining features 160 to corresponding slot features 124.

In another implementation, gas turbine engine 10 includes a locking assembly 110 fabricated as a ring or washer. In such an embodiment, locking assembly 110 includes a plurality of axial keyways 134 and slots 148 spaced circumferentially about the periphery of locking assembly 110. Each of the plurality of axial keyways 134 are inserted through respective windows 128 to couple with extended portion of bearing housing 106. In such an implementation, locking assembly 110 substantially circumscribes ball bearing 102. Alternatively, gas turbine engine may include any number of locking assemblies 110 having any number of axial keyways 134.

Figure 5:
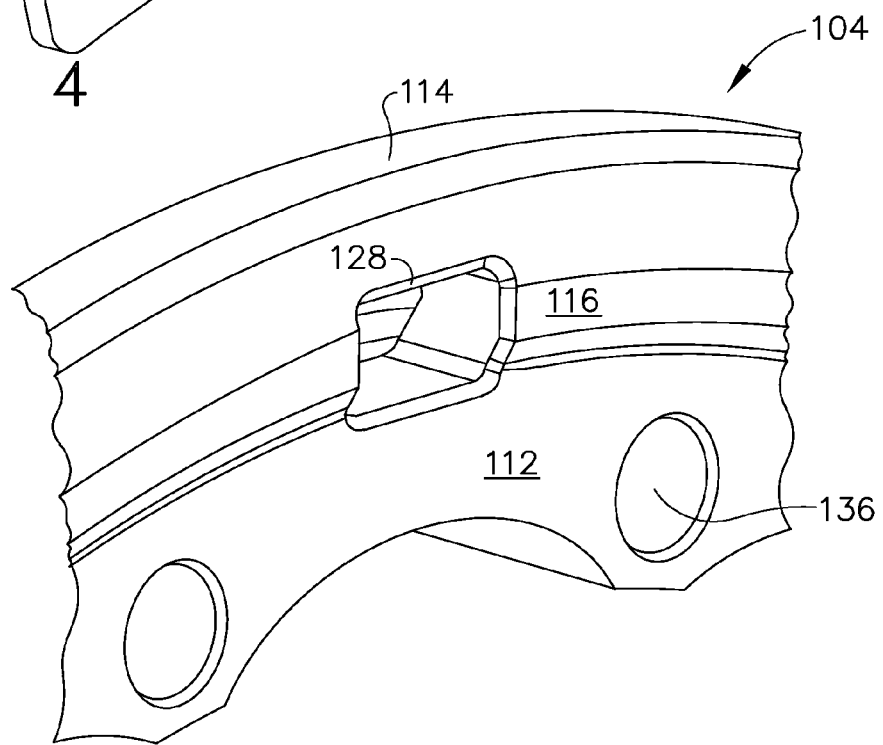
FIG. 5 is a perspective view of a portion of the exemplary bearing retainer 104 shown in FIG. 2.

FIG. 5 is a perspective view of a portion of an exemplary bearing retainer 104. In the illustrated embodiment, bearing retainer 104 is a "hook shaped" annular spanner nut. As described above, bearing retainer 104 defines a window 128 configured to accept axial keyway 134 of locking assembly 110. Window 128 may be substantially rectangular and be sized and shaped to receive axial keyway 134 with relatively minimal clearance around axial keyway 134. Alternatively, window 128 may be any shape that enables window 128 to receive axial keyway 134.

Bearing retainer 104 may be formed using any suitable manufacturing method. For example, bearing retainer 104 may be formed from a single piece of material, or may be formed from two or more individual elements which are joined together. Specifically, in at least one embodiment, inner portion 112, outer portion 114, and intermediate portion 116 may be individual elements brazed and or welded together.

Figure 6:
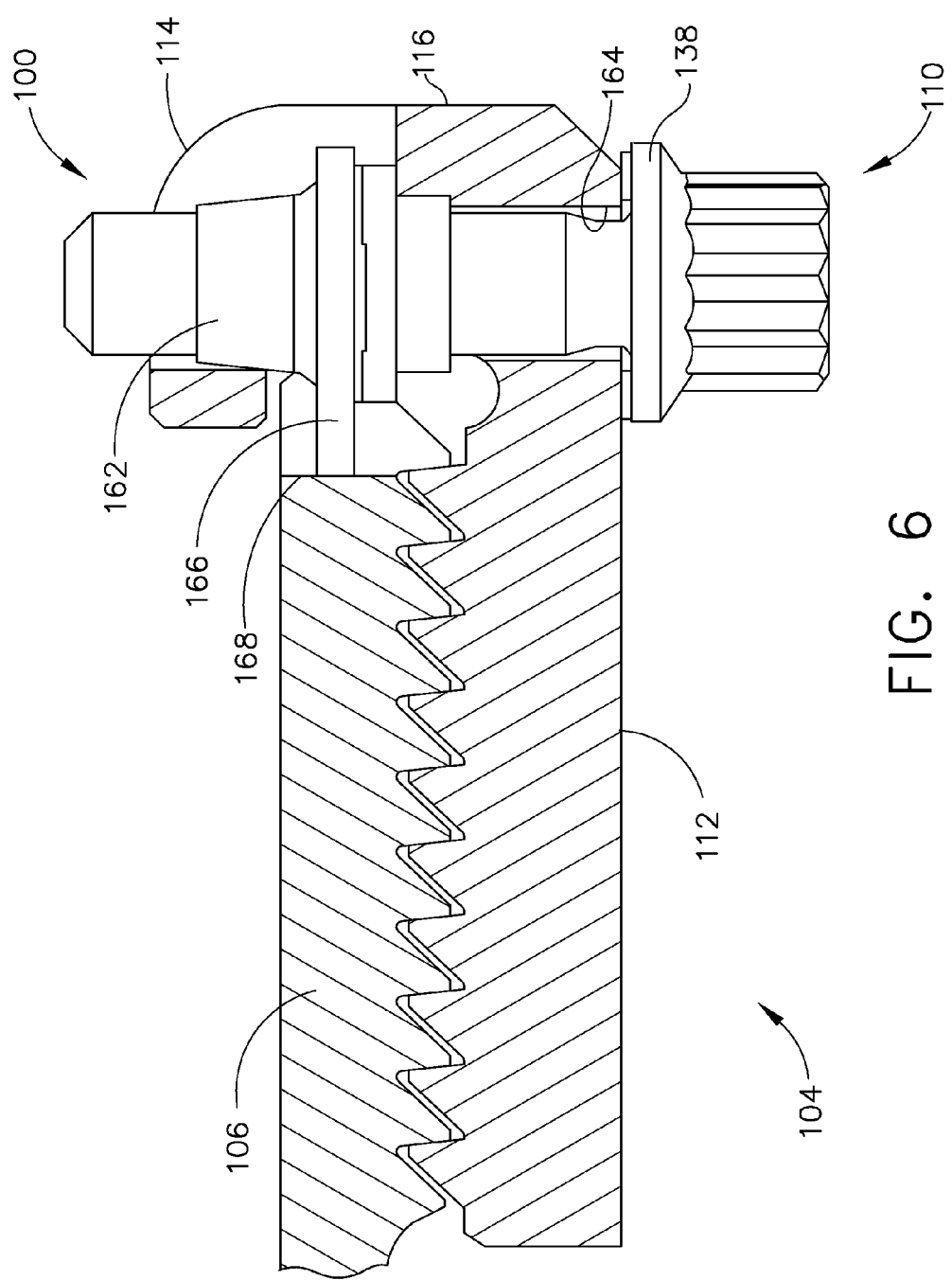
FIG. 6 is cross sectional view of an alternative embodiment of the bearing assembly shown in FIG. 2 and having a locking assembly with a D-head nut.

FIG. 6 is cross sectional view of an alternative embodiment of bearing assembly 100 including a locking assembly 110 having a D-head nut 162. In the alternative embodiment, bearing retainer 104 and bearing housing 106 are coupled by a radially extending retaining element 138. Specifically, retaining element 138 is inserted through a radially oriented opening 164 defined in bearing retainer 104. Opening 164 may extend radially through inner portion 112 and outer portion 114 of bearing retainer 104. In some embodiments, opening 164 is threaded to facilitate receiving a bolt and/or other threaded retaining element 138. D-head nut 162 receives retaining element 138, and exerts a clamping force on bearing retainer 104 based on the rotation of retaining element 138. D-head nut 162 may be a self-locking nut that does not require manual clamping to secure retaining element 138.

D-head nut 162 has a flat extending portion 166 that extends axially from D-head nut 162 and engages with a corresponding slot 168 in bearing housing 106. Flat extending portion 166 and slot 168 couple bearing housing 106 to D-head nut 162. When assembled, retaining element 138 and D-head nut 162 secures bearing retainer 104 to bearing housing 106, and facilitate preventing relative rotation between bearing retainer 104 and bearing housing 106.

In one implementation, D-head nut 162 is positioned within window 128 (shown in FIG. 2) defined in bearing retainer 104 to reduce radial space used by locking assembly 110. In addition, a locking tab (not shown) may be coupled to D-head nut 162. Specifically, the locking tab may be shaped to partially circumscribe D-head nut 162 and retain D-head nut 162 in a substantially static position during insertion of retaining element 138.

The embodiments described above provide a removable bearing assembly that is easy to assemble and disassemble, and that requires reduced radial clearance. The bearing assembly described herein includes a plurality of ball bearings that are secured in position by a bearing retainer and a bearing housing. The bearing retainer and the bearing housing are secured together by a locking assembly that is separately coupled to each of the bearing retainer and the bearing assembly. The locking assembly serves as an anti-rotation device to reduce deflections of the bearing under heavy cyclic forces, and prevents relative rotation between the bearing retainer and the bearing housing.

In the example embodiment, the locking assembly includes a substantially flat locking plate that defines at least one slot configured to receive a retaining element. The retaining element passes through the slot to self-locking inserts defined in the bearing retainer in order to couple the locking plate to the bearing retainer. The locking assembly also includes an axial keyway coupled to, or formed integrally with, the locking plate. The axial keyway extends axially aftward away from the locking plate and toward the bearing assembly. The axial keyway has a cavity defined in an aft axial end of the keyway, and the cavity is configured to receive a part of the bearing housing. The keyway extends through a window defined in the bearing retainer and receives an extended portion of the bearing housing within the cavity. The axial keyway and the extended portion of the bearing housing may have corresponding retaining features that secure the two elements together. Accordingly, the locking assembly is coupled to both the bearing housing and the bearing retainer, and facilitates preventing relative rotation between the two elements. Specifically, the axial keyway prevents relative rotation between the two elements, and the locking plate securely couples the locking assembly into position.

As the retaining element and axial keyway are oriented in an axial direction, the locking assembly requires less radial clearance. Furthermore, the locking assembly defined herein facilitates mechanical repair and assembly by securing the locking assembly to an axial face of the bearing retainer. In addition, damping material and/or deeper bearing housing scallops can be implemented without substantially limiting access to the bearing assembly during maintenance. Accordingly, technicians may more efficiently repair and replace bearing assemblies having locking assemblies as described herein.

Bearing retainers and locking assemblies of the type described herein may be useful in other installations besides gas turbine engines. For example, such retainers may be utilized in the automotive field, power generation field, and/or any other field where it is desired to retain a bearing in position during operation. The disclosure may be related to any other type of machinery where there is limited axial and/or radial space and rotational forces may be a concern.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly comprising:
   a bearing retainer including an inner portion, an outer portion spaced radially apart from the inner portion, and an intermediate portion connecting the inner portion and the outer portion, wherein the inner portion and the outer portion define a space there-between;
   a bearing housing having an extended portion positioned within the space; and
   a locking assembly comprising a locking plate and an axial keyway that extends axially away from the locking plate and toward the bearing housing, wherein the locking plate is coupled to the bearing retainer and the axial keyway is coupled to the extended portion of the bearing housing;
   wherein the intermediate portion has a first axial end and a second axial end, and a window is defined through a part of the intermediate portion from the first axial end to the second axial end.

2. A bearing assembly according to claim 1, wherein the window is substantially rectangular in shape, and is sized to receive the axial keyway.

3. A bearing assembly according to claim 1, wherein the axial keyway extends through the window, and couples with the extended portion of the bearing housing.

4. A bearing assembly according to claim 1, wherein the locking assembly is removably secured to the bearing retainer and to the bearing housing.

5. A bearing assembly according to claim 1, further comprising a plurality of locking assemblies spaced circumferentially about the periphery of the bearing retainer.

6. A bearing assembly comprising:
   a bearing retainer including an inner portion, an outer portion spaced radially apart from the inner portion, and an intermediate portion connecting the inner portion and the outer portion, wherein the inner portion and the outer portion define a space there-between;
   a bearing housing having an extended portion positioned within the space; and
   a locking assembly comprising a locking plate and an axial keyway that extends axially away from the locking plate and toward the bearing housing, wherein the locking plate is coupled to the bearing retainer and the axial keyway is coupled to the extended portion of the bearing housing;
   wherein the axial keyway defines a cavity in the aft axial end of the axial keyway, and the cavity is configured to receive a part of the extended portion of the bearing housing.

7. A bearing assembly according to claim 6, wherein the cavity includes a plurality of retention features, the extended portion includes a plurality of corresponding machined slots, and the retention features and corresponding machined slots securely engage the axial keyway and the extended portion.

8. A bearing assembly according to claim 6, wherein the locking assembly is removably secured to the bearing retainer and to the bearing housing.

9. A bearing assembly according to claim 6, further comprising a plurality of locking assemblies spaced circumferentially about the periphery of the bearing retainer.

10. A bearing assembly comprising:
    a bearing retainer including an inner portion, an outer portion spaced radially apart from the inner portion, and an intermediate portion connecting the inner portion and the outer portion, wherein the inner portion and the outer portion define a space there-between;
a bearing housing having an extended portion positioned within the space; and
a locking assembly comprising a locking plate and an axial keyway that extends axially away from the locking plate and toward the bearing housing, wherein the locking plate is coupled to the bearing retainer and the axial keyway is coupled to the extended portion of the bearing housing;
wherein the locking assembly is an annular ring having a plurality of axial keyways spaced about the periphery of the ring, wherein each of the plurality of axial keyways is configured to extend through a corresponding window in the bearing retainer.

11. A bearing assembly according to claim 10, wherein the locking assembly is removably secured to the bearing retainer and to the bearing housing.

12. A bearing assembly according to claim 10, further comprising a plurality of locking assemblies spaced circumferentially about the periphery of the bearing retainer.

13. A bearing assembly comprising:
a bearing retainer including an inner portion, an outer portion spaced radially apart from the inner portion, and an intermediate portion connecting the inner portion and the outer portion, wherein the inner portion and the outer portion define a space there-between;
a bearing housing having an extended portion positioned within the space; and
a locking assembly comprising a locking plate and an axial keyway that extends axially away from the locking plate and toward the bearing housing, wherein the locking plate is coupled to the bearing retainer and the axial keyway is coupled to the extended portion of the bearing housing;
wherein the bearing retainer defines a plurality of self-locking inserts configured to receive respective retaining elements that secure the locking plate to the bearing retainer.

14. A bearing assembly according to claim 13, wherein the retaining elements are at least one of a bolt, a screw, a cotter pin, a lockwire, and a polymeric compound.

15. A bearing assembly according to claim 13, wherein the locking assembly is removably secured to the bearing retainer and to the bearing housing.

16. A bearing assembly according to claim 13, further comprising a plurality of locking assemblies spaced circumferentially about the periphery of the bearing retainer.

17. A locking assembly for use in a gas turbine engine, the locking assembly comprising:
a substantially flat locking plate that defines at least one slot;
an axial keyway coupled to the flat locking plate and extending axially outward from the locking plate, wherein the axial keyway is configured to be inserted through a window of a bearing retainer and coupled to a bearing housing; and
at least one retaining element configured to be inserted through a respective slot of the locking plate such that the locking plate is secured to the bearing retainer.

18. The locking assembly of claim 17, wherein an aft axial end of the axial keyway defines a cavity configured to receive a portion of the bearing housing.

19. The locking assembly of claim 18, wherein a plurality of retaining features extend from the axial keyway to the cavity, and the plurality of retaining features are configured to engage with corresponding slots on the bearing housing.

20. A method of assembling a bearing assembly for use in a gas turbine engine, the method comprising:
positioning an extended portion of a bearing housing between an inner portion and an outer portion of a bearing retainer, wherein the inner portion is radially spaced from the outer portion and an intermediate portion connects the inner portion and the outer portion;
defining a window in the intermediate portion of the bearing retainer, wherein the window extends from a first axial end to a second axial end of the intermediate portion;
coupling an axial keyway to a locking plate, wherein the axial keyway extends axially away from the locking plate;
coupling the locking plate to the bearing retainer;
inserting the axial keyway through the window; and
coupling the axial keyway with the extended portion of the bearing housing.

* * * * *